United States Patent
Kono

(10) Patent No.: US 11,295,533 B2
(45) Date of Patent: Apr. 5, 2022

(54) PRODUCT EVALUATION RESULT DISPLAY SYSTEM

(71) Applicant: Honda Motor Co., Ltd., Tokyo (JP)

(72) Inventor: Ichiro Kono, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 98 days.

(21) Appl. No.: 16/718,138

(22) Filed: Dec. 17, 2019

(65) Prior Publication Data
US 2020/0226845 A1    Jul. 16, 2020

(30) Foreign Application Priority Data
Jan. 10, 2019    (JP) .............................. JP2019-003001

(51) Int. Cl.
*G06T 19/20* (2011.01)
*G06T 17/00* (2006.01)

(52) U.S. Cl.
CPC .............. *G06T 19/20* (2013.01); *G06T 17/00* (2013.01); *G06T 2219/2012* (2013.01)

(58) Field of Classification Search
CPC . G06T 19/20; G06T 2219/2012; G06T 17/00; G06T 2219/004; G06T 15/005
See application file for complete search history.

(56) References Cited

U.S. PATENT DOCUMENTS 6,810,300 B1 * 10/2004 Woltman ................ G06F 30/23
                                                         700/132
2018/0357339 A1 * 12/2018 Kim ........................ H01L 22/20

FOREIGN PATENT DOCUMENTS

| JP | 2009104584 | 5/2009 |
| JP | 2012247268 | 12/2012 |
| JP | 5312961 | 10/2013 |
| JP | 2018190098 | 11/2018 |

OTHER PUBLICATIONS

"Office Action of Japan Counterpart Application", dated Sep. 29, 2020, with English translation thereof, p. 1-p. 4.

* cited by examiner

*Primary Examiner* — Said Broome
(74) *Attorney, Agent, or Firm* — JCIPRNET

(57) ABSTRACT

A product image representing an upper body of a vehicle having a reference shape and a shift index segment image linearly extending from each of a plurality of designated virtual space locations of the product image in each of a plurality of directions of virtual spaces are displayed. Each of the plurality of designated virtual space locations corresponds to each of a plurality of designated real space locations of the upper body of the vehicle having the reference shape. A length of the shift index segment image represents a quantity of a virtual space position shift amount. The "virtual space position shift amount" corresponds to a real space position shift amount in a direction of a real space at a designated real space location of the upper body based on reference data of the upper body.

5 Claims, 4 Drawing Sheets

PRODUCT EVALUATION RESULT DISPLAY SYSTEM

CROSS-REFERENCE TO RELATED APPLICATION

This application claims the priority benefits of Japan Patent Application No. 2019-003001, filed on Jan. 10, 2019. The entirety of the above-mentioned patent application is hereby incorporated by reference herein and made a part of this specification.

BACKGROUND OF THE DISCLOSURE

Technical Field

The disclosure relates to a system for displaying a measurement result of a product.

Related Art

There has been proposed a technical method of analyzing an accumulated error at a specific evaluation part of two members and outputting a calculation result of an influence degree of the accumulated error when the two members, at least one of which is elastically deformed due to a weight thereof, are assembled (for example, see patent literature 1).

LITERATURE OF RELATED ART

Patent Literature

[Patent literature 1] Japanese Patent No. 5312961

However, it is difficult to intuitively comprehend the magnitude of the accumulated error at the evaluation part of the two assembled members.

Accordingly, the disclosure provides a system that can easily comprehend a shape error of a product such as a vehicle or a position error of each part.

SUMMARY

A product evaluation result display system of the disclosure includes an input interface that acquires product shape measurement data representing a measurement result of a real space shape of a product, an output interface that displays an image, and an image control device that causes the output interface to display a product image representing a three-dimensional (3D) reference shape of the product, associates a shift index image representing a real space position shift amount in a direction of a real space at a designated real space location of the product from reference data of the product of the product shape measurement data with a designated virtual space location corresponding to the designated real space location in the product image, and causes the output interface to display the shift index image.

DESCRIPTION OF THE EMBODIMENTS

Configuration

Figure 1:
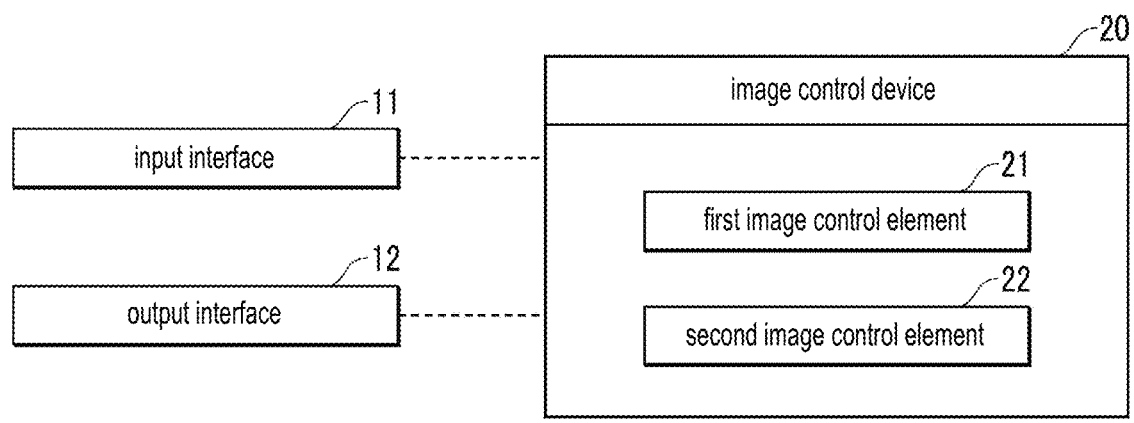
FIG. 1 is an explanatory configuration diagram of a product evaluation result display system as an embodiment of the disclosure.

A product evaluation result display system illustrated in FIG. 1 serving as one embodiment of the disclosure includes an input interface 11, an output interface 12, and an image control device 20.

The input interface 11 acquires product shape measurement data representing a measurement result of a real space shape (3D shape) of a product. For example, the input interface 11 may be optically connected to a device that optically measures a real space position of the product in a plurality of designated real space locations, and has the device as a structural component. The input interface 11 has a command input device including a keyboard, a touch panel, a mouse pointing device or a voice input device, or any combination thereof as another structural component. The output interface 12 includes a display device.

The image control device 20 includes a first image control element 21 and a second image control element 22. Each of the image control elements 21 and 22 includes a storage device such as a memory and an arithmetic processing unit (a CPU, a single processor core, a multiprocessor core, etc.) that reads data from the storage device, generates image data by executing arithmetic processing on the data, and causes the output interface 12 to display an image based on the image data.

The first image control element 21 causes the output interface 12 to display a product image representing a 3D reference shape of the product. The first image control element 21 changes a posture, a scale, a display range, etc. of a product image 210 in a 3D virtual space according to a command through the input interface 11. That is, through the input interface 11, it is possible to change a viewpoint position facing the product image 210. Consequently, it is possible to rotate the product image 210 in the 3D virtual space and to change the scale.

The second image control element 22 associates a shift index image representing a real space position shift amount in a direction of a real space at a designated real space location of the product from reference data of the product shape measurement data acquired by the input interface 11 with a designated virtual space location corresponding to the designated real space location in the product image, and causes the output interface 12 to display the shift index image. The second image control element 22 changes a display form of the shift index image following a change in the posture, scale, display range, etc. of the product image 210 in the 3D virtual space according to a command through the input interface 11.

Function

According to the product evaluation result display system serving as an embodiment of the disclosure, product shape measurement data representing a real space shape (3D real space position at a plurality of designated real space locations) of an upper body of a vehicle (corresponding to "product" in the present embodiment) manufactured by assembling a plurality of parts such as a roof panel, a center pillar, a front inside seal, and a front side frame is acquired by the input interface 11.

A real space position shift amount in each of directions of a plurality of real spaces at each of the plurality of designated real space locations of the upper body based on a design value as reference data of the upper body stored in the storage device is calculated or determined by the second image control element 22 based on the product shape measurement data. The real space position shift amount is obtained from a difference between the product shape measurement data and the reference data. The "product" may be an intermediate finished product or a complete finished product related to the vehicle, and may be any product other than the vehicle, such as an electric appliance.

Figure 2:
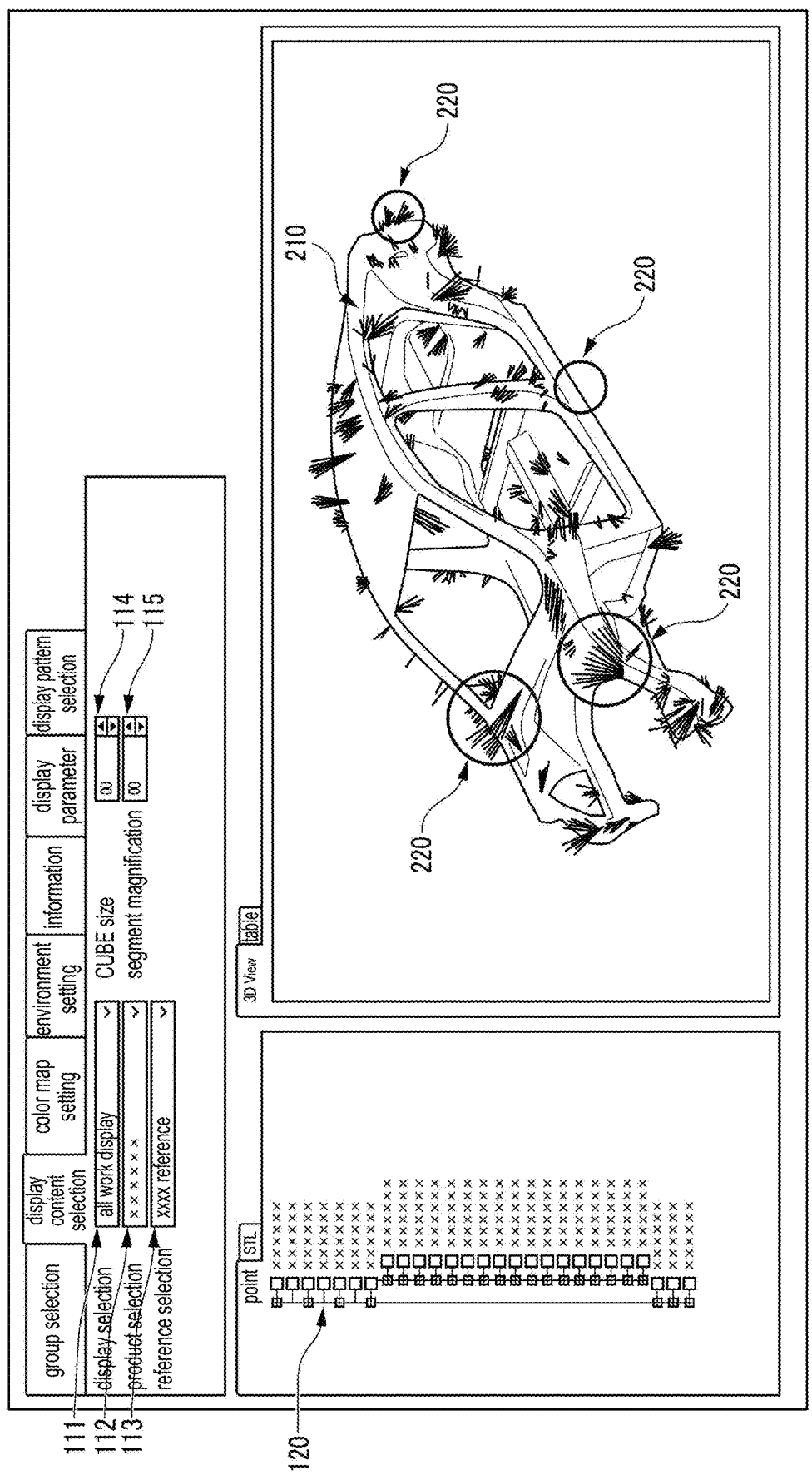
FIG. 2 is an explanatory diagram related to a first example of a product image and a shift index image.
Figure 3:
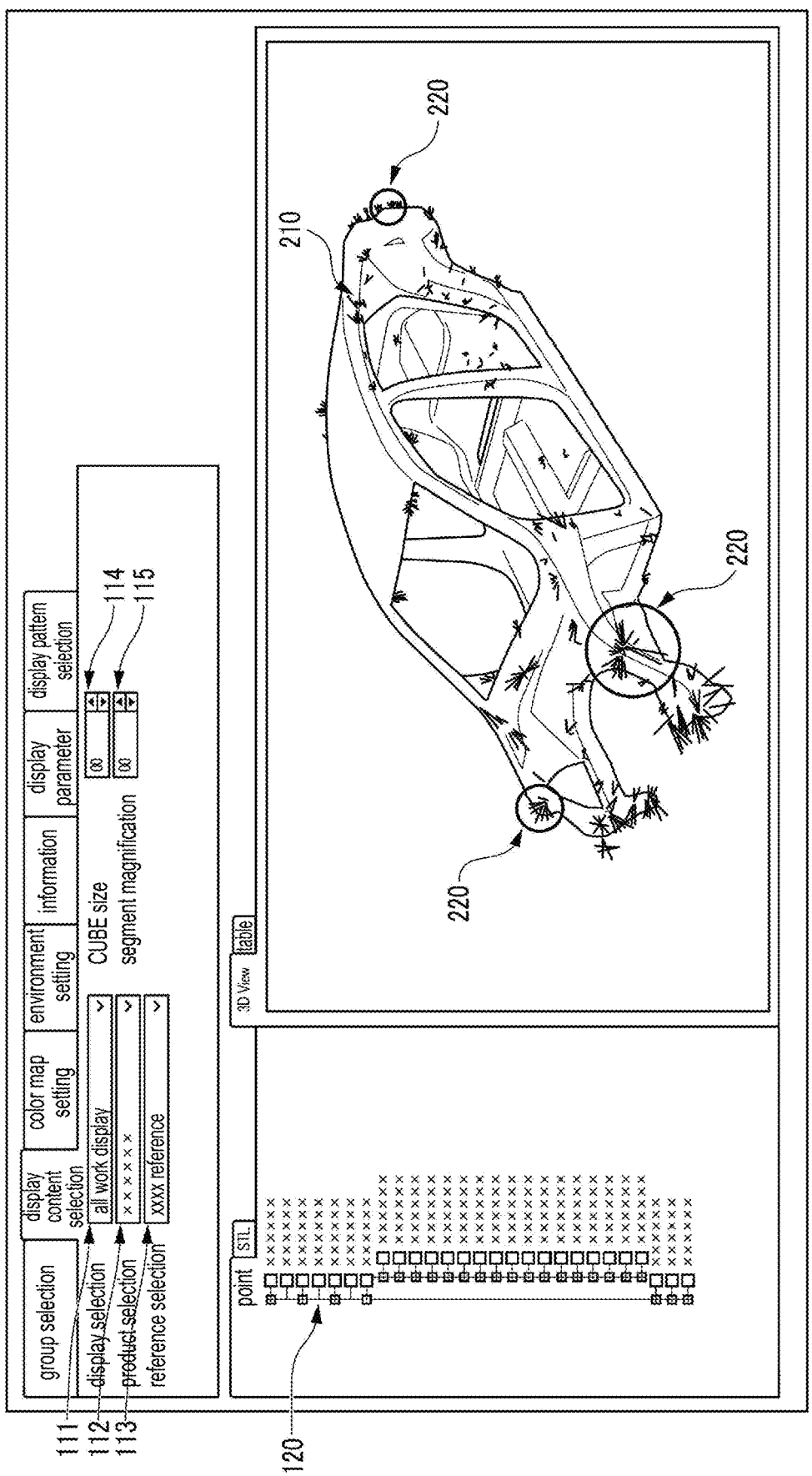
FIG. 3 is an explanatory diagram related to a second example of a product image and a shift index image.

In response, for example, images illustrated in FIG. 2 and FIG. 3 are displayed on the display device included in the output interface 12. The product image 210 representing the 3D shape of the upper body of the vehicle having a reference shape and a shift index segment image 220 linearly extending from each of a plurality of designated virtual space locations of the product image 210 in each of directions of a plurality of virtual spaces are displayed in a lower right window.

Each of the plurality of designated virtual space locations corresponds to each of the plurality of designated real space locations of the upper body of the vehicle having a reference shape. A length of the shift index segment image represents a quantity of the virtual space position shift amount. The "virtual space position shift amount" corresponds to the real space position shift amount in the direction of the real space at the designated real space location of the upper body based on the reference data of the upper body. Similarly, a color of a shift index line segment also represents the virtual space position shift amount. For example, the longer a wavelength representing hue (the larger a hue scale), the greater the virtual space position shift amount.

Figure 4:
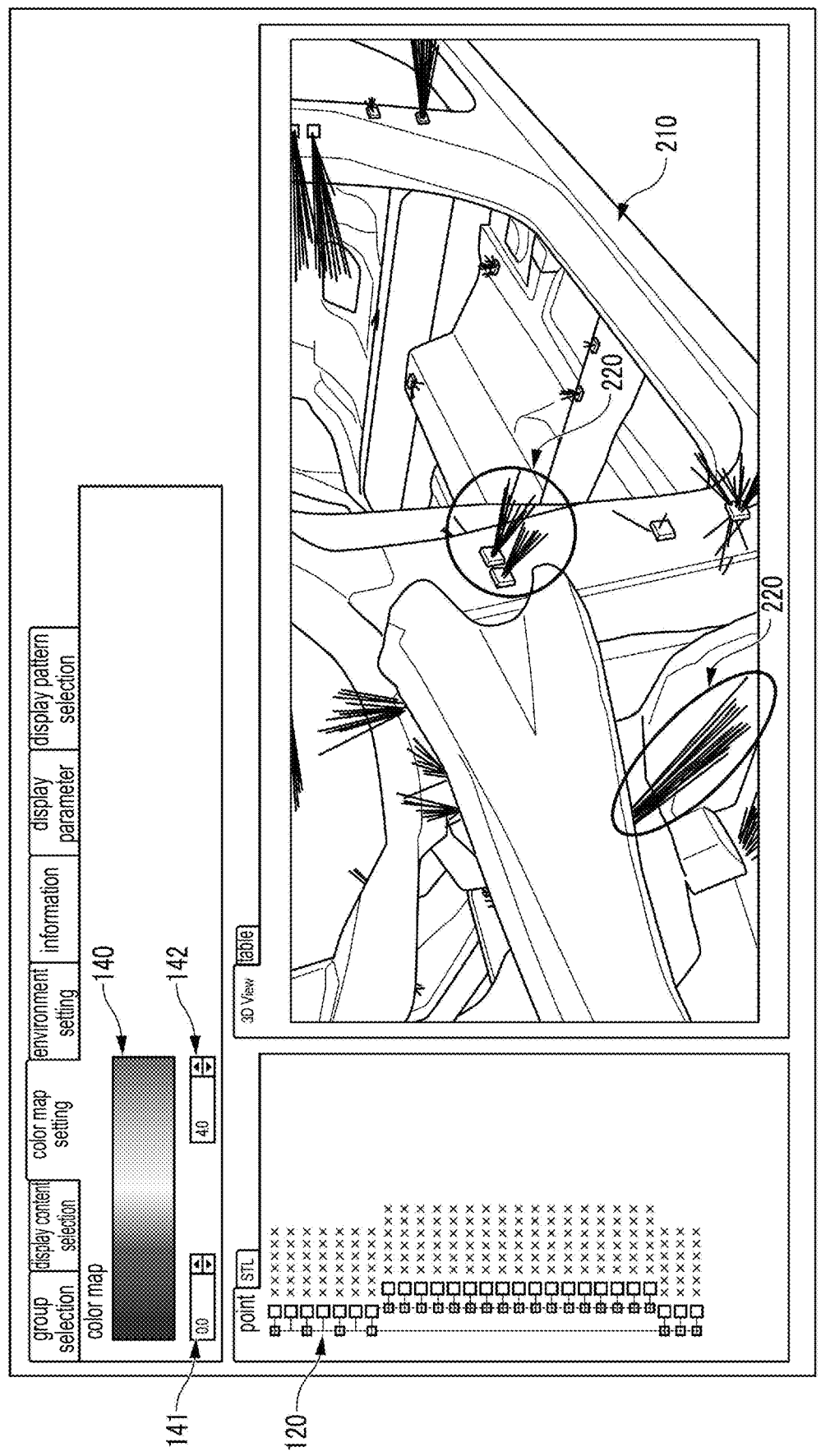
FIG. 4 is an explanatory diagram related to a third example of a product image and a shift index image.

Since a plurality of shift index segment images 220 having lengths and hues corresponding to real space positional shift amounts linearly extend from one designated virtual space location in a plurality of different virtual space directions, it appears that sparks of various hue combinations are scattered in a straight line from each of the plurality of designated virtual space locations (see FIG. 2 to FIG. 4).

Corresponding to a "select display content" tag selected from a plurality of tags, a menu bar 111 for selecting a specific part of or all the upper body, a menu bar 112 for selecting a car model and an upper body corresponding to the car model, a menu bar 113 for selecting reference data of the upper body, a menu bar 114 for selecting a display size of the product image 210, and a menu bar 115 for selecting a display size of the shift index segment image 220 are displayed in an upper window. In each menu bar, item content is selected by a pull-down menu method through the command input device included in the input interface 11.

Through the menu bar 115, a ratio of the scale of the real space position shift amount relative to the scale of the product is selected. For example, in a case that "100" is selected as the ratio, even when the real space position shift amount is 1 mm, a length of a shift index image segment (virtual space position shift amount) is exaggerated as if the length were a length corresponding to 100 mm in the virtual space displayed on the output interface 12.

A tree diagram 120 in which a first layer includes check boxes for selecting product shape measurement data and a second layer includes check boxes for selecting a designated real space location (or a part including the designated real space location) from the selected product shape measurement data is displayed in a lower left window.

In FIG. 2, the shift index segment image 220 corresponding to a case in which a design shape value is selected as the reference data of the product (the upper body of the vehicle) from a pull-down menu by the menu bar 113 is displayed in the lower left window. In FIG. 3, the shift index segment image 220 corresponding to a case that an average value of real space position shift amounts of a plurality of pieces of product shape measurement data is selected as the reference data of the product (the upper body of the vehicle) from a pull-down menu by the menu bar 113 is displayed in a lower left window. Specifically, each of a plurality of shift index segment images from an average value when N products (N is an integer) are measured is represented as a vector starting from a designated virtual space location and is displayed in the lower left window in FIG. 3.

By switching between FIG. 2 and FIG. 3, whether the amount of shift from a design value of the upper body is similar between N products (a variation is small), or whether shift occurs in various directions depending on the product (a variation is large) can be determined, and thus it is possible to take measures corresponding to an event characteristic.

In an image illustrated in FIG. 4, a color map 140 (hue scale) and menu bars 141 and 142 for selecting a real space position shift amount corresponding to hue corresponding to each of an upper limit value and a lower limit value of the color map 140 are displayed in an upper window corresponding to a "color map setting" tag selected from the plurality of tags. In addition, in a lower right window, the product image 210 corresponding to a part rather than the entire upper body is displayed, and the shift index segment image 220 extending from a designated virtual space position included in the product image is displayed.

Effect

According to the product evaluation result display system serving as the embodiment of the disclosure, it is possible to allow the user to intuitively and easily recognize a degree of the real space position shift amount in each of directions of a plurality of real spaces based on the reference data of the product present at each designated real space location of the product depending on the length and the magnitude of the hue scale of each of a plurality of shift index segment images 220 extending from each designated virtual space location of the product image 210 displayed on the output interface 12.

Another Embodiment of Disclosure

In the embodiment, the quantity of the real space position shift amount is expressed by both the length and the magnitude of the hue scale of the shift index segment image 220. However, as another embodiment, the quantity of the real space position shift amount may be expressed by one of the length and the magnitude of the hue scale of the shift index segment image 220.

The shift index segment image linearly extending from the designated virtual space location is displayed on the output interface 12 as the shift index image. However, a segment image that extends in a curved shape such as an arc or wavy line from the designated virtual space location (the larger the curvature or length, the larger the position shift amount), a spherical figure that spreads around the designated virtual space location (the larger the diameter, the larger the position shift amount), and the like, may be displayed on the output interface 12 as the shift index image.

According to the product evaluation result display system having the above configuration, the shift index image is output on the output interface in association with the designated virtual space location in the product image (product in a virtual space in which a 3D image is expressed) representing the 3D reference shape of the product. The "shift index image" represents a real space position shift amount in a direction of a real space at a designated real space location of the product from reference data of the product of the product shape measurement data representing the measurement result of the real space shape of the product acquired by the input interface. For this reason, it is possible to allow the user to easily recognize a degree of the real space position shift amount (error) in the direction of the real space present at the designated real space location of the product based on the reference data of the product through the product image and the shift index image displayed on the output interface.

In one embodiment of the product evaluation result display system of the disclosure, the image control device causes the output interface to display, as the shift index image, a shift index segment image linearly extending from the designated virtual space location by merely a virtual space position shift amount corresponding to the real space position shift amount in a direction of a virtual space corresponding to the direction of the real space.

According to the product evaluation result display system having the above configuration, the "direction of the virtual space" which is an extending direction and the "virtual space position shift amount" which is a length in the virtual space of the shift index segment image as the shift index image displayed on the output interface correspond to the direction of the real space and the real space position shift amount, respectively. For this reason, it is possible to allow the user to intuitively and easily recognize a degree of the real space position shift amount in the direction of the real space present at the designated real space location of the product based on the reference data of the product using the shift index segment image displayed on the output interface.

In one embodiment of the product evaluation result display system of the disclosure, the image control device causes the output interface to display, as the shift index image, the shift index segment image linearly extending from each of a plurality of the designated virtual space locations corresponding to each of a plurality of the designated real space locations.

According to the product evaluation result display system having the above configuration, it is possible to allow the user to intuitively and easily recognize a degree of the real space position shift amount in each of directions of a plurality of real spaces present at one or a plurality of designated real space locations of the product based on the reference data of the product using each of a plurality of shift index segment images extending from one or a plurality of designated virtual space locations displayed on the output interface.

In one embodiment of the product evaluation result display system of the disclosure, the image control device causes the output interface to display, as the shift index image, the shift index segment image linearly extending by merely the virtual space position shift amount being a result of multiplying the real space position shift amount by a certain proportional coefficient.

According to the product evaluation result display system having the above configuration, it is possible to allow the user to more accurately and easily recognize a quantity of the real space position shift amount at the designated real space location of the product based on the reference data of the product using a length (virtual space position shift amount) of the shift index segment image extending from the designated virtual space location displayed on the output interface.

In one embodiment of the product evaluation result display system of the disclosure, the image control device causes the output interface to display the shift index image in different forms according to a quantity of the real space position shift amount.

According to the product evaluation result display system having the above configuration, it is possible to allow the user to intuitively and easily recognize a quantity of the real space position shift amount at the designated real space location of the product based on the reference data of the product using a display form of the shift index image such as the shift index segment image in the output interface.

In one embodiment of the product evaluation result display system of the disclosure, the image control device causes the output interface to display the shift index image using, as the reference data, a design value or an average value obtained by averaging the real space position shift amount corresponding to the product shape measurement data.

According to the product evaluation result display system having the above configuration, it is possible to allow the user to more intuitively and easily recognize a shift amount of the real space position at the designated real space location of the product based on the "design value" or the "average value obtained by averaging the real space position shift amount corresponding to the product shape measurement data" as the reference data.

What is claimed is:

1. A product evaluation result display system comprising:
    an input interface that acquires product shape measurement data representing a measurement result of a real space shape of a product;
    an output interface that displays an image; and
    an image control device that causes the output interface to display a product image representing a three-dimensional reference shape of the product, associates a shift index image representing a real space position shift amount in a direction of a real space at a designated real space location of the product from reference data of the product of the product shape measurement data with a designated virtual space location corresponding to the designated real space location in the product image, and causes the output interface to display the shift index image,
    wherein the image control device causes the output interface to display, as the shift index image, a shift index segment image linearly extending from the designated virtual space location by merely a virtual space position shift amount corresponding to the real space position shift amount in a direction of a virtual space corresponding to the direction of the real space.

2. The product evaluation result display system according to claim 1, wherein the image control device causes the output interface to display, as the shift index image, the shift index segment image linearly extending from each of a plurality of the designated virtual space locations corresponding to each of a plurality of the designated real space locations.

3. The product evaluation result display system according to claim 1, wherein the image control device causes the output interface to display, as the shift index image, the shift index segment image linearly extending by merely the virtual space position shift amount being a result of multiplying the real space position shift amount by a certain proportional coefficient.

4. The product evaluation result display system according to claim 1, wherein the image control device causes the output interface to display the shift index image in different forms according to a quantity of the real space position shift amount.

5. The product evaluation result display system according to claim 1, wherein the image control device causes the output interface to display the shift index image using, as the reference data, a design value or an average value obtained by averaging the real space position shift amount corresponding to the product shape measurement data.

* * * * *